US011328714B2

(12) United States Patent
Freed et al.

(10) Patent No.: US 11,328,714 B2
(45) Date of Patent: May 10, 2022

(54) PROCESSING AUDIO DATA

(71) Applicant: International Business Machines Corporation, Armonk, NY (US)

(72) Inventors: Andrew R. Freed, Cary, NC (US); Marco Noel, Quebec (CA); Victor Povar, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 16/732,778

(22) Filed: Jan. 2, 2020

(65) Prior Publication Data

US 2021/0210079 A1 Jul. 8, 2021

(51) Int. Cl.
*G10L 15/19* (2013.01)
*G10L 15/06* (2013.01)
*G10L 15/14* (2006.01)

(52) U.S. Cl.
CPC ............ *G10L 15/19* (2013.01); *G10L 15/063* (2013.01); *G10L 15/14* (2013.01)

(58) Field of Classification Search
CPC ........ G10L 15/19; G10L 15/14; G10L 15/063
See application file for complete search history.

(56) References Cited

U.S. PATENT DOCUMENTS

| 5,806,030 | A | | 9/1998 | Junqua | |
|---|---|---|---|---|---|
| 6,064,957 | A | | 5/2000 | Brandow | |
| 6,064,959 | A | * | 5/2000 | Young | G10L 15/22 |
| | | | | | 704/251 |
| 6,138,093 | A | | 10/2000 | Ekudden | |
| 7,761,296 | B1 | | 7/2010 | Bakis | |
| 8,150,694 | B2 | | 4/2012 | Kennewick | |
| 9,971,765 | B2 | * | 5/2018 | Li | G06F 40/216 |
| 10,388,272 | B1 | * | 8/2019 | Thomson | G10L 15/063 |
| 2005/0108010 | A1 | | 5/2005 | Frankel | |
| 2008/0126100 | A1 | * | 5/2008 | Grost | G10L 15/26 |
| | | | | | 704/275 |
| 2009/0248415 | A1 | | 10/2009 | Jablokov | |
| 2011/0231188 | A1 | * | 9/2011 | Kennewick | G10L 15/187 |
| | | | | | 704/236 |
| 2020/0135179 | A1 | * | 4/2020 | Yang | G10L 15/063 |

OTHER PUBLICATIONS

"Adding a grammar to a custom language model", IBM Cloud Docs, Speech to Text, Last Updated: Oct. 4, 2019, retrieved from the internet on Oct. 18, 2019, 6 pages, <https://cloud.ibm.com/docs/services/speech-to-text?topic=speech-to-text-grammarAdd>.

Liu et al., "The USTC-NEL Speech Translation system at IWSLT 2018", arXiv:1812.02455v1 [cs.CL] Dec. 6, 2018, 6 pages.

Mell et al., "The NIST Definition of Cloud Computing", Recommendations of the National Institute of Standards and Technology, Special Publication 800-145, Sep. 2011, 7 pages.

* cited by examiner

*Primary Examiner* — Michelle M Koeth
(74) *Attorney, Agent, or Firm* — David K. Mattheis; Maeve M Carpenter

(57) ABSTRACT

Processing data for speech recognition by generating hypotheses from input data, assigning each hypothesis, a score according to a confidence level value and hypothesis ranking, executing a pass/fail grammar test against each hypothesis, generating replacement hypotheses according to grammar test failures, assigning each replacement hypothesis a score according to a number of hypothesis changes, and providing a set of hypotheses, wherein the set comprises at least one replacement hypotheses.

20 Claims, 4 Drawing Sheets

PROCESSING AUDIO DATA

BACKGROUND

The disclosure relates generally to processing digital audio data for speech recognition applications. The disclosure relates particularly to processing digital audio data by replacing invalid output hypotheses according to recognized translation failure patterns.

Natural language processing (NLP) receives textual input and provides an analysis of the input for use in expert systems, chatbots, and other machine learning based systems. NLP may be combined with speech recognition (speech to text) software to provide a speech to text to natural language processing system. Such a system includes several processes. A speech engine analyzes an input digital audio file. The speech engine outputs one or more hypotheses for the textual conversion of the digital audio, according to the translation capabilities of the speech engine, to a linguistic analyzer. The NLP software may analyze the digital audio file as a series of n-grams, (segments of the audio file having n 1, 2, 3, 4, etc.) portions. Multiple hypotheses of a single input file may be output. Each hypothesis includes different possibilities for the set of n-grams and a score from the speech engine related to the confidence of the engine that the portions of the hypothesis are accurate. A linguistic analyzer processes the set of speech engine output hypotheses using linguistic analysis to rule out some of the set of hypotheses as linguistically unlikely translations of the input file.

Training a machine learning speech to text system requires analysis of a representative training data set. Alpha-numeric input files can require extensive speech to text software system training. A representative training data set encompassing all possible alpha-numeric combinations can large. As an example, a representative training data set for an eleven character data string having a combination of numeric characters (1-9), numeric characters 0-9, alphabetic characters (excluding S, L, O, I, B, and Z), and alpha-numeric characters (any of 0-9, or alphabetic excluding S, L, O, I, B, and Z), may have trillions of possible combinations.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the generation of original hypotheses from input data, examining the hypotheses according to a linguistic grammar, assigning a score to each hypotheses, generating replacement hypotheses, scoring the replacement hypotheses, and providing an output set of scored and ranked hypotheses.

Aspects of the invention disclose methods, systems and computer readable media associated with processing data for speech recognition by generating hypotheses from input data, executing a pass/fail grammar test against each hypothesis, assigning each hypothesis, a score according to a confidence level and hypothesis ranking, generating replacement hypotheses according to grammar test failures, assigning each replacement hypothesis a score according to a number of hypothesis changes, and providing a set of hypotheses for analysis.

Aspects of the invention disclose methods, systems and computer readable media associated with processing data for speech recognition by generating a language model including legal variations of input data, as well as a distribution of an input data character and random input data, creating a pass/fail grammar test capable of validating input data, identifying input data grammar test failure patterns, generating hypotheses from input data, assigning each hypothesis, a score according to a confidence level and hypothesis ranking, executing a pass/fail grammar test against each hypothesis, generating replacement hypotheses according to grammar test failures and grammar test failure patterns, assigning each replacement hypothesis a score according to a number of hypothesis changes, and providing a set of hypotheses for analysis.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
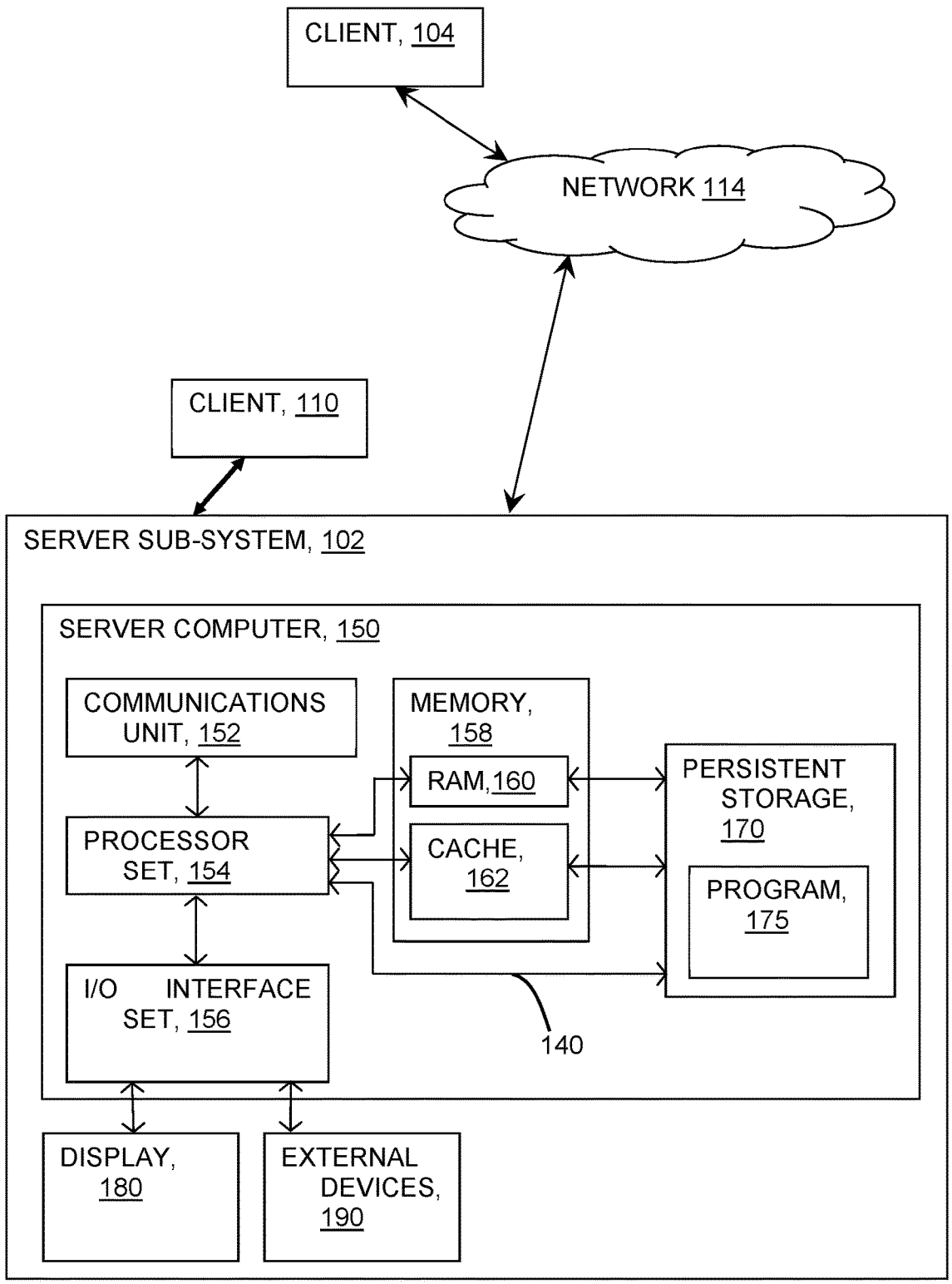
FIG. 1 provides a schematic illustration of a system, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., the generation of original hypotheses from input data, examining the hypotheses according to a linguistic grammar, assigning a score to each hypotheses, generating replacement hypotheses, scoring the replacement hypotheses, and providing an output set of scored and ranked hypotheses, etc.). These solutions are not abstract and cannot be performed as a set of mental acts by a human due to the processing capabilities needed to provide an output set of text hypotheses from input data, for example. Further, some of the processes performed may be performed by a specialized computer for carrying out defined tasks related to speech to text translations. For example, a specialized computer can be employed to carry out tasks related to generating text hypotheses, scoring hypotheses, testing hypotheses against a grammar, generating replacement hypotheses for those which fail the grammar test, scoring the replacement hypotheses, providing the best hypotheses for further processing, or the like.

By way of example, and without limiting the disclosed inventions, a machine learning system for processing insurance beneficiary interactions must receive and recognize beneficiary identification information. Such information may be in the form of a multiple character string, e.g. 11 alphanumeric characters where C, A, AN, N, A, AN, N, A, A, N, N, represents the string of characters. Here, C is numeric 1 through 9, N is numeric 0 through 9, A is alphabetic excluding S, L, O, I, B, and Z, and AN is either A or N. This string has 9*20*30*10*20*30*10*20*20*10*10 or 12,960,000,000,000 possible values. Training a speech recognition model using all possible combinations is resource prohibitive. Training using n-gram slices of the string may not be possible due to the complexity of the rules regarding the series of characters included in the string. The output of the model consists of hypothesis which are passed to a linguistic analyzer. The linguistic analyzer appliers a grammar to the hypotheses and rules out linguistically unlikely versions. It may not be practical to pass all possible hypotheses to a linguistic model, or all linguistic model outputs to the NLP software for further analysis due to limitations on computational resources. Disclosed embodiments provide a model and method to train the model to output a manageable number of text hypotheses for downstream processing process such as linguistic processing to further reduce the number of output hypotheses, or NLP analysis of the set of hypotheses.

In an embodiment, a method includes training a language recognition model using a set of input data where each input consists of a legal (valid) variation of the target input data. For the example, each training input data consists of a valid combination of a C, A, AN, N, A, AN, N, A, A, N, N. string. The training data includes a plurality of input strings randomly formed from distributions associated with each character of the string. (1-9 for C, 0-9 for N, etc.). In this embodiment, the training data set includes digital audio files of the sample strings formed from audio files associated with each character of each string.

In an embodiment, a language model includes a convolutional neural network, or recurrent neural network performing a classification task. Training the model includes providing input training data together with associated target output data and minimizing a model loss function associated with the weightings of network nodes as the model generates an output string according to the input training data and the associated target data. Training concludes when loss function value improvements are no longer achieved with the presentation of additional input target data pairs.

The trained model recognizes individual as well as combinations of characters from provided input audio files. The trained model provides text strings as output together with a confidence level value indicating the confidence of the model in each character of the output string as well as an overall confidence level value associated with the overall string. In an embodiment, the score of the output string corresponds to a classification score of the trained neural network.

In an embodiment, the program develops a grammar, or grammar test, for the input data. The grammar test reflects the known rules associated with the input data. For example, the first character is a C, the second A, etc. During training, application of the grammar test to model outputs results in a pass/fail separation of output hypotheses based upon the grammar test. The result is a set of passed outputs and a set of failed outputs. In an embodiment, the set of failed output hypotheses is evaluated, and recurring failure patterns are identified, e.g., transposing "a" for "8", "x" for "6", etc. In this embodiment, the method ranks failure patterns according to the frequency of occurrence of each pattern among the overall set of failure patterns. In this embodiment, the method determines a solution to each failure pattern, e.g., substituting "8" for "a", "6" for "x", etc. The trained model includes the ranked failure patterns and failure solutions.

In an embodiment, the method presents new input data to the trained language model including the ranked common failure patterns and associated failure pattern solutions. The model generates N hypotheses for each provided input. The N hypotheses provide variations on the possible values of each character of the input string. In this embodiment, some of the generated hypotheses have incorrect types of characters at string locations, some have too many or too few characters in the hypothesized character string.

In an embodiment, the method classifies each of the N hypotheses as "passed" or "failed" after applying the developed grammar test to the set of hypotheses. In this embodiment, passed hypotheses include strings having the correct number of characters as well as the correct type of character at each string location. Failed hypotheses include those having too few or too many characters as well as those having one or more incorrect character types, numeric instead of alphabetic, alphabetic rather than numeric, etc.

In an embodiment, the method assigns a score to each hypothesis of the original set of hypotheses. The score includes a confidence level from the speech engine and a rank order among the set of hypotheses. In an embodiment, each character of the string carries a confidence level value. The overall confidence level value includes a sum of the individual character confidence level values. In an embodiment, the method ranks hypotheses according to frequency of occurrence.

In an embodiment, the method evaluates invalid hypotheses which failed the grammar test according to the saved failure patterns. In this embodiment, the method generates new hypotheses by applying failure pattern solutions to the characters of the invalid strings, e.g., "8" is converted to "a", "x" is converted to "6" in the replacement hypotheses. The method generates a new score for each replacement hypothesis. The new score includes terms for the old score of the original hypothesis as well as a correction factor and a term for the number of corrections made to generate the replacement hypothesis. New_score=old_score*correction_factor*number_of_corrections. In this embodiment, the correction_factor relates to the commonality of the corrected failure patterns, more common patterns have a higher correction_factor, or a static value predetermined and used for all replacement hypotheses.

In an embodiment, the method passes the best hypotheses to downstream processing, either linguistic analysis, or NLP of the hypothesis. In this embodiment, the method selects hypotheses as members of the set of best hypotheses according to the scoring of the original and replacement hypotheses. In an embodiment, the method selects all hypotheses having a score above a predetermined threshold as a member of the set of best hypotheses for further processing. In an embodiment, the method selects best hypotheses set members according to hypotheses frequency, selecting as best hypotheses set members those hypotheses having a frequency in the overall set of hypotheses above a predefined frequency. In an embodiment, the method selects as members of the set of best hypotheses those hypotheses among the original and replacement hypotheses having both a frequency among the overall set of hypotheses above a predetermined frequency as well as a score above a predefined threshold.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise speech recognition (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the speech recognition program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., speech recognition program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
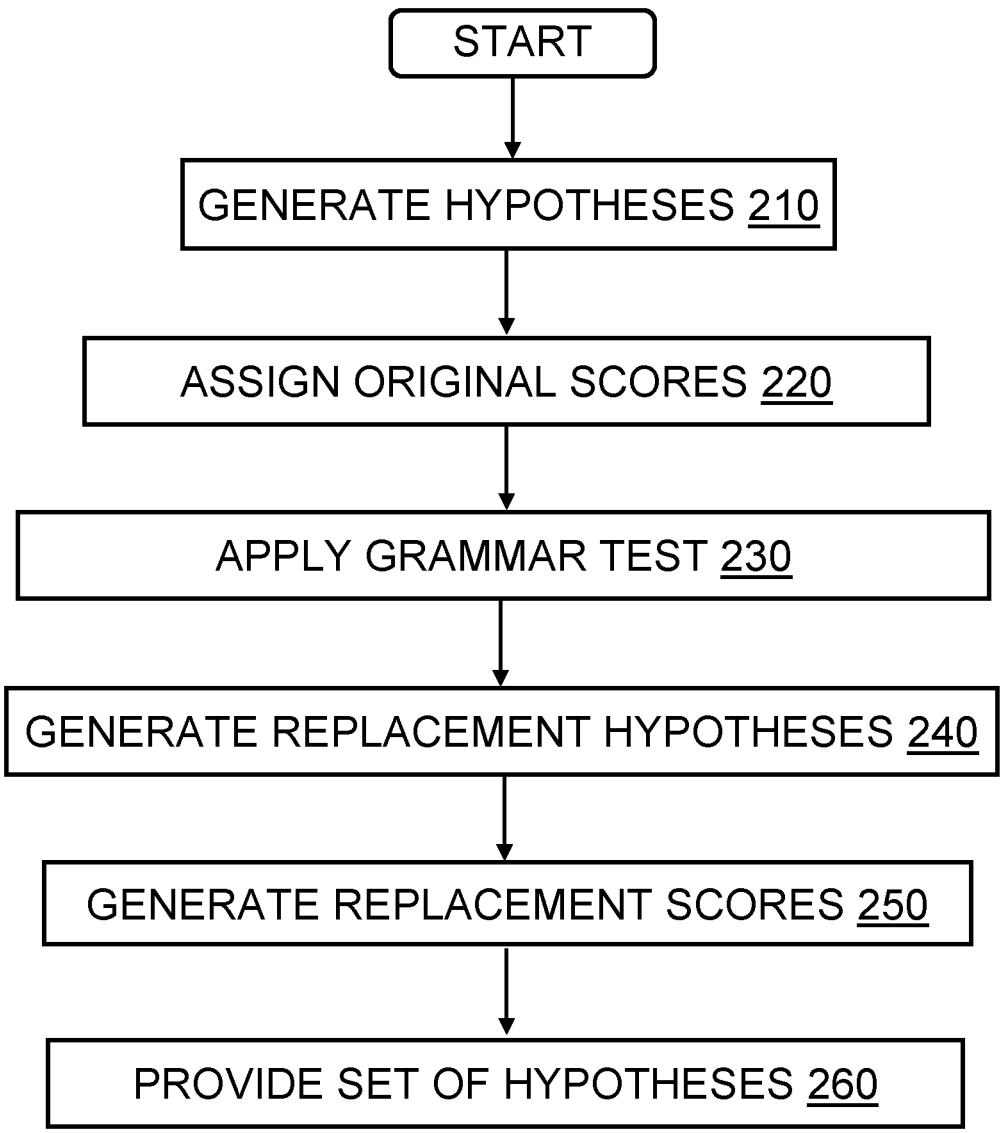
FIG. 2 provides a flowchart depicting an operational sequence, according to an embodiment of the invention.

FIG. 2 provides a flowchart 200, illustrating exemplary activities associated with the practice of the disclosure. After program start, at block 210, the speech recognition language processing program 175 receives input data. The input data includes digital audio files. In an embodiment, the digital audio files have a particular predefined format such as an insurance beneficiary identification. At this block, the model produces N output string hypotheses based upon the input string. Associated confidence level values for each output hypotheses are also produced. The program ranks the N output hypotheses according to the confidence level values and frequency of occurrence.

In an embodiment, the speech recognition language processing program includes a model that has been trained to translate the digital audio file contents into a string of text characters. In this embodiment, training the program model includes the use of a set of generated input data. The input data includes randomly generated strings of characters. Each string of characters complies with the grammar rules associated with the target input data for the program, model. The strings are composed by randomly selecting characters from distributions of valid characters associated with each position of the input data string. Composing an eleven-character string of numeric, alphabetic and alpha-numeric characters includes randomly selecting a numeric, alpha-numeric, or alphabetic character from a respective distribution of valid characters of each type for each character of the input string.

Digital audio files for the created input data strings are used in conjunction with the created text strings to train the neural networks or other machine learning systems of the model. The trained model provides one or more output text strings for any provided input audio file. The trained model further provides a confidence level value associated with each provided output. In an embodiment, the program provides the confidence level value for each character of the provided output string as well as the overall string. In an embodiment, the model determines an output score according to a model classification score for the output string.

At block 220, speech recognition program 175 scores each hypothesis. Speech recognition program 175 derives the score of each hypothesis according to the confidence level value associated with the hypotheses, and the ranking of the hypotheses among the set of original hypotheses. Higher ranked hypotheses receive a higher scoring. Higher confidence level values receive a higher scoring. The confidence level value of the hypothesis relates to the combination of confidence level values associated with each character of the hypothesis.

A grammar test differentiates between valid and invalid output hypotheses. The grammar test provides a pass/fail analysis of the output hypotheses' strings. In an embodiment, the grammar test includes character types for each string character as well as total string character length for strings having a defined length—phone numbers, dates, identification numbers, etc. In an embodiment, the grammar test includes additional rules relating to the target language, including pronoun consistency, verb tense consistency, singular—plural consistency, etc.

In an embodiment, application of the grammar test during training yields sets of valid (passed) and invalid (failed) output hypotheses. Evaluation of the failed hypotheses yields identified failure modes or patterns. In an embodiment, the structure of the grammar test provides additional information regarding the nature of the failure, e.g., third character is the wrong type, expected numeric, found alphabetic. Further analysis by the method reviewing the target string and the hypotheses string reveals that the hypotheses string included an "a" where the particular character should have been numeric, and the target string included an "8". The method tracks the occurrence of each such failure mode and ranks all failure modes according to frequency of occurrence.

At block 230, speech recognition program 175 applies the grammar test to each of the output hypotheses yielding pass/fail results across the set of N hypotheses in rank order according to the confidence level value as described above. In an embodiment, the grammar test evaluates each character of the hypotheses according to character type. The test provides an indication of pass/fail for each character and for failures indicates the failure pattern for that character as well.

At block 240, speech recognition program 175 generates replacement hypotheses for at least a portion of those hypotheses which failed the grammar test. In an embodiment, evaluation of each failed hypotheses yields an indication of the failure patterns of the hypotheses. Generating replacement hypotheses includes executing failure pattern solutions for each failed character of the output hypothesis. "8" becomes "a", "5" becomes "F" etc. Replacement hypotheses are not generated for failed hypotheses having character failures without corresponding failure patterns.

At block 250, speech recognition program 175 generates scores for replacement hypotheses. Replacement hypotheses' scores include terms for the underlying original hypothesis score as well as the number_of_corrections made, and a correction_factor term. In an embodiment, the correction_factor term corresponds to a predefined value for all corrections. In an embodiment, the correction_factor varies according to the frequency of occurrence of the failure pattern. Common failure patterns have a higher correction value factor than uncommon failure patterns. Replacement hypotheses scores are comparable to original hypotheses scores enabling comparison of the combined set of original and replacement hypotheses.

At block 260, speech recognition program 175 ranks the overall set of output hypotheses text strings according to the hypotheses scores and also evaluated in terms of the frequency of occurrence of the text string among the overall combined set of original and replacement output hypotheses. Speech recognition program 175 provides a set of H hypotheses for downstream processing by linguistic evaluators and/or NLP software. In an embodiment, the set of hypotheses includes original and replacement hypotheses. In an embodiment, the method selects the H hypotheses having the highest scores among the overall set of hypotheses. In an embodiment, the method selects all hypotheses having a score above a predefined threshold as the set. In an embodiment, the method selects all hypotheses having a frequency of occurrence among the overall set of hypotheses. In an embodiment, the method selects all hypotheses satisfying a threshold level of occurrence and having a score above a defined threshold. In an embodiment, other selection criteria are used to select the hypotheses to be provided, e.g., selection of the top P percent of the overall set where P is a predefined value.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
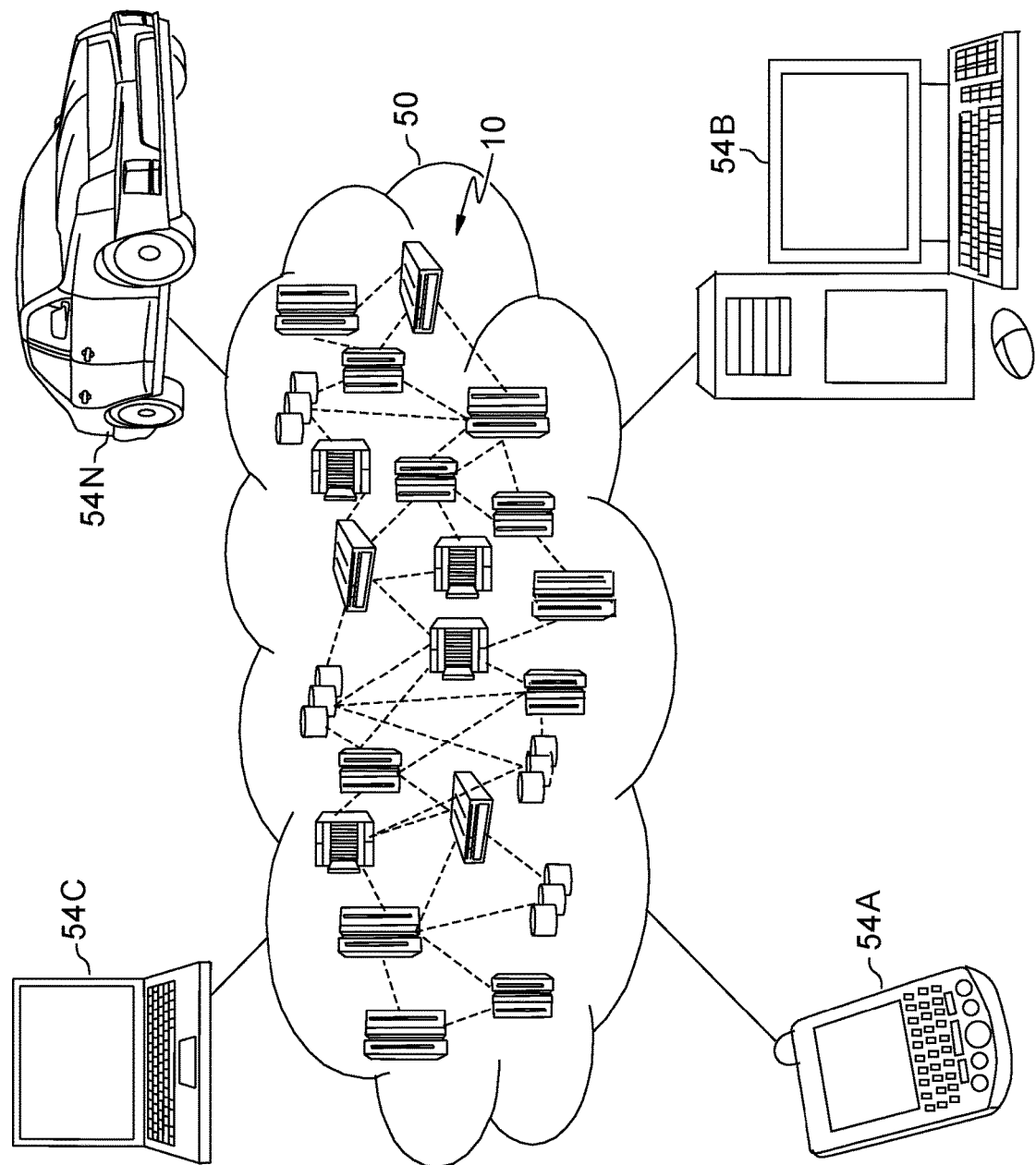
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
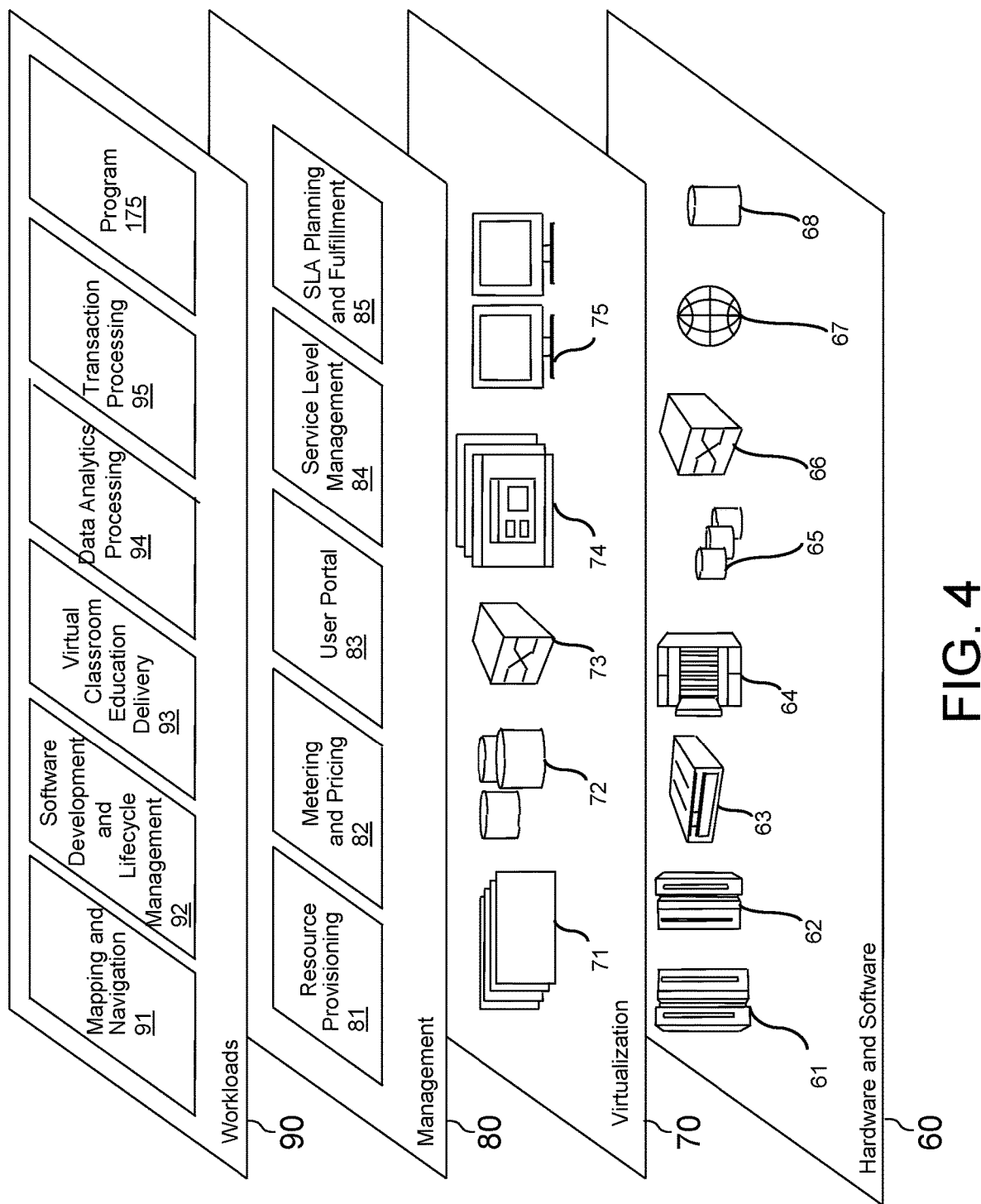
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speech recognition program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for processing data for speech recognition, the method comprising:
    training a language recognition classification model using training data comprising audio files associated with labeled valid variations of target input data to minimize a loss function;
    identifying a recurring failure pattern in the training data;
    identifying a solution for the recurring failure pattern;
    generating original hypotheses from input data;
    assigning each original hypothesis, a score according to a confidence level and an original hypothesis ranking;
    executing a pass/fail grammar test against a first original hypothesis;
    evaluating, by the language recognition classification model, the first original hypothesis which failed the grammar test according to the recurring failure pattern;
    generating, by the language recognition classification model, one or more replacement hypotheses for the first original hypothesis according to the solution for the recurring failure pattern;
    assigning each replacement hypothesis, a score according to a number of hypothesis changes; and
    providing a set of hypotheses, wherein the set comprises at least one of the replacement hypotheses.

2. The computer implemented method according to claim 1, further comprising:
    generating a language model comprising legal variations of the input data.

3. The computer implemented method according to claim 2, wherein the language model further comprises a distribution of an input character.

4. The computer implemented method according to claim 1, further comprising generating the grammar test associated with the input data.

5. The computer implemented method according to claim 1, further comprising identifying input data grammar test failure patterns.

6. The computer implemented method according to claim 5, wherein generating one or more replacement hypotheses comprises replacing hypothesis characters according to grammar test failure patterns.

7. The computer implemented method according to claim 1, further comprising providing the set of hypotheses according to the original and replacement hypotheses scores.

8. A computer program product for managing application execution, the computer program product comprising one or more computer readable storage devices and program instructions collectively stored on the one or more computer readable storage devices, the program instructions comprising:
    program instructions to train a language recognition classification model using training data comprising audio files associated with labeled valid variations of target input data to minimize a loss function;
    program instructions to identify a recurring failure pattern in the training data;
    program instructions to identify a solution for the recurring failure pattern;
    program instructions to generate hypotheses from input data;
    program instructions to assign each hypothesis, a score according to a confidence level and hypothesis ranking;
    program instructions to execute a pass/fail grammar test against a first hypothesis;
    program instructions to evaluate the first original hypothesis which failed the grammar test according to the recurring failure pattern;
    program instructions to generate one or more replacement hypotheses for the first original hypothesis according to the solution for the recurring failure pattern;
    program instructions to assign each replacement hypothesis a score according to a number of hypothesis changes; and
    program instructions to provide a set of hypotheses, wherein the set of hypotheses comprises at least one of the replacement hypotheses.

9. The computer program product according to claim 8, further comprising:
    program instructions to generate a language model comprising legal variations of the input data.

10. The computer program product according to claim 9, wherein the language model further comprises a distribution of an input character.

11. The computer program product according to claim 8, further comprising program instructions to generate the grammar test associated with the input data.

12. The computer program product according to claim 8, further comprising program instructions to identify input data grammar test failure patterns.

13. The computer program product according to claim 12, wherein generating replacement hypothesis comprises replacing hypothesis characters according to grammar test failure patterns.

14. The computer program product according to claim 8, further comprising program instructions to provide the set of hypotheses according to the original and replacement hypotheses scores.

15. A computer system for managing application execution, the computer system comprising:
    one or more computer processors;
    one or more computer readable storage devices; and
    stored program instructions on the one or more computer readable storage devices for execution by the one or more computer processors, the stored program instructions comprising: program instructions to train a language recognition classification model using training data comprising audio files associated with labeled valid variations of target input data to minimize a loss function;
    program instructions to identify a recurring failure pattern in the training data;
    program instructions to identify a solution for the recurring failure pattern;

program instructions to generate hypotheses from input data;
program instructions to assign each hypothesis, a score according to a confidence level and hypothesis ranking;
program instructions to execute a pass/fail grammar test against a first hypothesis;
program instructions to evaluate the first original hypothesis which failed the grammar test according to the recurring failure pattern;
program instructions to generate one or more replacement hypotheses for the first original hypothesis according to the solution for the recurring failure pattern;
program instructions to assign each replacement hypothesis a score according to a number of hypothesis changes; and
program instructions to provide a set of hypotheses, wherein the set of hypotheses comprises at least one of the replacement hypotheses.

16. The computer system according to claim 15, further comprising:
program instructions to generate a language model comprising legal variations of the input data.

17. The computer system according to claim 16, wherein the language model further comprises a distribution of an input character.

18. The computer system according to claim 15, further comprising program instructions to generate the grammar test associated with the input data.

19. The computer system according to claim 15, further comprising program instructions to identify input data grammar test failure patterns.

20. The computer system according to claim 19, wherein generating replacement hypothesis comprises replacing hypothesis characters according to grammar test failure patterns.

* * * * *